US008843644B2

(12) United States Patent
Shamilian et al.

(10) Patent No.: US 8,843,644 B2
(45) Date of Patent: Sep. 23, 2014

(54) METHOD AND APPARATUS FOR ENABLING A MANAGEMENT SYSTEM TO INTERFACE WITH MANAGED DEVICES

(75) Inventors: John H. Shamilian, Tinton Falls, NJ (US); Thomas L. Wood, Colts Neck, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 1832 days.

(21) Appl. No.: 11/770,098

(22) Filed: Jun. 28, 2007

(65) Prior Publication Data

US 2009/0006590 A1 Jan. 1, 2009

(51) Int. Cl.
*G06F 15/16* (2006.01)
*H04L 12/24* (2006.01)
*H04L 12/26* (2006.01)

(52) U.S. Cl.
CPC ............... *H04L 12/24* (2013.01); *H04L 41/12* (2013.01); *H04L 43/0817* (2013.01); *H04L 41/0266* (2013.01); *H04L 41/00* (2013.01); *H04L 41/0213* (2013.01)
USPC ........................................................ 709/228

(58) Field of Classification Search
USPC .......................................... 709/223, 227–228
See application file for complete search history.

(56) References Cited

U.S. PATENT DOCUMENTS

| 6,167,448 | A | 12/2000 | Hemphill et al. |
| 6,405,310 | B1 * | 6/2002 | Simpson ........................... 713/1 |
| 7,275,098 | B1 * | 9/2007 | Becher et al. .................. 709/223 |
| 2001/0004745 | A1 * | 6/2001 | Villalpando ................... 709/223 |
| 2002/0184300 | A1 * | 12/2002 | Schmeling et al. ........... 709/202 |
| 2004/0010576 | A1 * | 1/2004 | Hyndman et al. ............. 709/223 |
| 2005/0210123 | A1 | 9/2005 | Wang et al. |
| 2005/0278569 | A1 * | 12/2005 | Srinivasan et al. .............. 714/25 |
| 2006/0265483 | A1 * | 11/2006 | Wang et al. ................... 709/223 |

OTHER PUBLICATIONS

PCT Search Report & Written Opinion in PCT/US2008/007576, Lucent Technologies Inc., Applicant, dated Nov. 12, 2008, 22 pages.
"Universal Plug and Play Device Architecture, UPnP, Version 1.0" Internet Citation, [Online] XP002210614 Retrieved from the Internet: URL:http://www.upnp.org. [retrieved on Jun. 8, 2002].

* cited by examiner

Primary Examiner — Jason Recek
(74) Attorney, Agent, or Firm — Wall & Tong, LLP

(57) ABSTRACT

The invention includes a method and apparatus for interfacing with a managed device. A method according to one embodiment includes receiving a message including an identifier indicative of a location at which interface information associated with the managed device is stored, obtaining the interface information, and initiating a request to perform a function on the managed device using the interface information. The interface information includes information adapted for use by a management system to interface with the managed device. The interface information includes one or more interface routines and one or more interface routine descriptions. The interface routine(s) is specified using an interpreted language, such as Java, Visual Basic, and the like. The interface routine description is specified using a descriptive language, such as XML, XHTML, and the like.

20 Claims, 3 Drawing Sheets

METHOD AND APPARATUS FOR ENABLING A MANAGEMENT SYSTEM TO INTERFACE WITH MANAGED DEVICES

FIELD OF THE INVENTION

The invention relates to the field of management systems and, more specifically, to communications between management systems and managed devices.

BACKGROUND OF THE INVENTION

Management systems are deployed in communications networks to monitor and control the operational characteristics of the communications networks, including individual network elements of the communication networks (typically referred to as managed network elements). For example, element management systems may be deployed to perform network element management functions, and network management systems may be deployed to perform network management functions. Management systems typically communicate with the managed network elements using management protocols, such as Simple Network Management Protocol (SNMP), Common Management Information Protocol (CMIP), Transaction Language 1 (TL1), TR069, and the like. Disadvantageously, however, such existing management protocols require a management system to have a priori knowledge regarding the managed network elements, otherwise the management system is unable to communicate with the managed network elements.

SUMMARY OF THE INVENTION

Various deficiencies in the prior art are addressed through the invention of a method and apparatus for interfacing with a managed device. A method according to one embodiment includes receiving a message including an identifier indicative of a location at which interface information associated with the managed device is stored, obtaining the interface information, and initiating a request to perform a function on the managed device using the interface information. The interface information includes information adapted for use by a management system to interface with the managed device. The interface information includes one or more interface routines and one or more interface routine descriptions. The interface routine(s) is specified using an interpreted language, such as Java, Visual Basic, and the like. The interface routine description is specified using a descriptive language, such as XML, XHTML, and the like.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention enables a management system to interface with a managed device, including accessing and controlling the managed device, without having any a priori knowledge regarding the managed device. The present invention enables a management system to interface with a managed device by enabling the management system to obtain interface routines, and associated descriptions of the interface routines, for the managed device which the management system uses to interface with the managed device to perform one or more management functions (e.g., to access the managed device to retrieve status information, to perform one or more configuration functions, and the like, as well as various combinations thereof).

Figure 1:
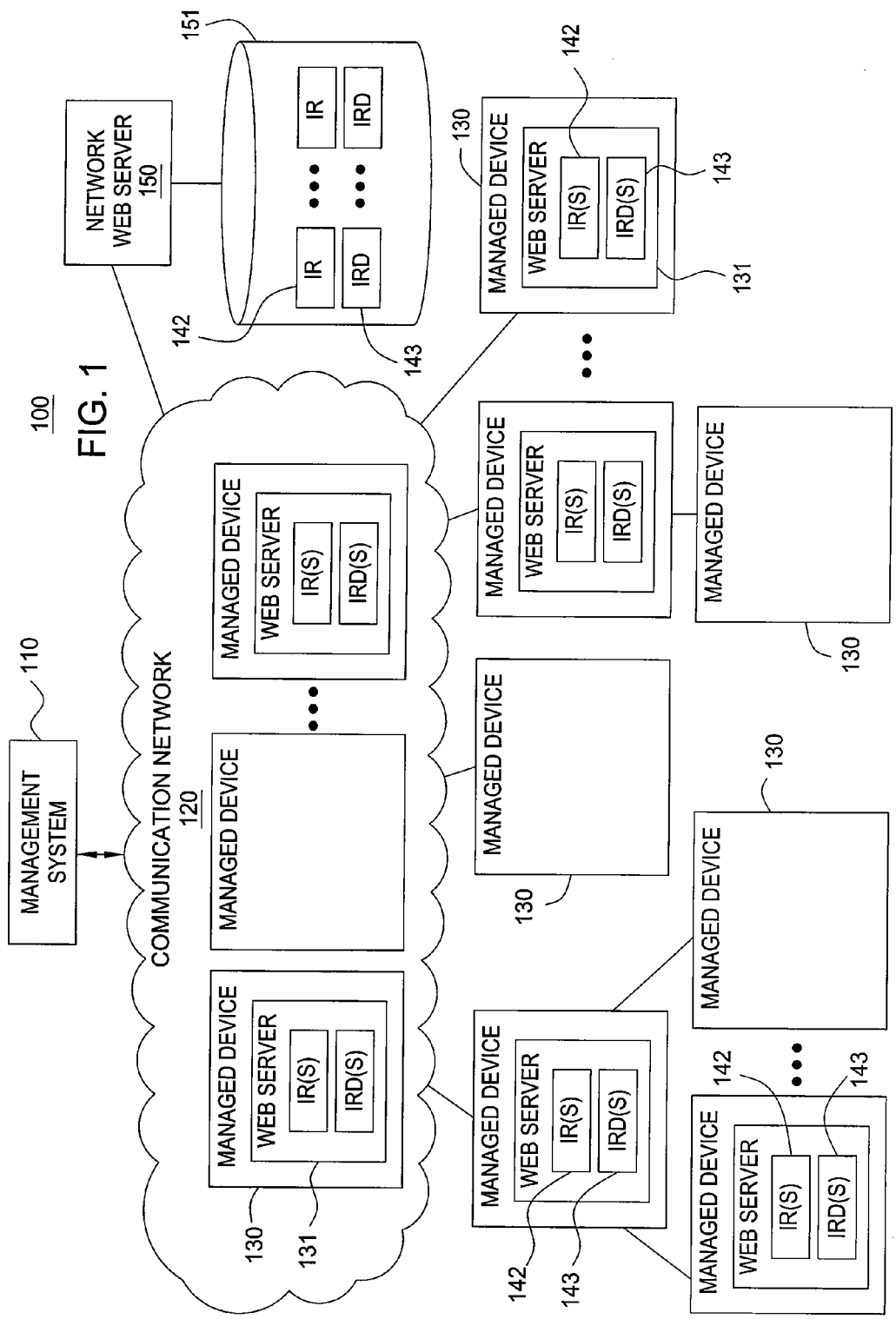
FIG. 1 depicts high-level block diagram of a communication network including a management system and managed devices.

FIG. 1 depicts high-level block diagram of a communication network architecture. Specifically, communication network architecture 100 of FIG. 1 includes a management system (MS) 110, a communication network (CN) 120, and a plurality of managed devices (MDs) $130_1$-$130_N$ (collectively, MDs 130). Although primarily depicted and described with respect to a specific communication network architecture, the present invention may be implemented in any communication network architecture in which one or more management systems manage managed devices (e.g., using different numbers, types, and configurations of management systems and associated managed devices).

MS 110 is any management system. MS 110 may be implemented in any manner for implementing a management system. MS 110 may include processors, memory, support circuits, and the like, as well as various combinations thereof. MS 110 may include one or more databases for storing information related to supported management functions. MS 110 may include one or more different interfaces. For example, MS 110 may include a command line interface (CLI), a graphical user interface (GUI), and the like, as well as various combinations thereof, by which one or more administrators may perform supported management functions. For example, MS 110 may be an element management system (EMS), a network management system (NMS), and the like, as well as various combinations thereof.

MS 110 interfaces with MDs 130s (using interface routines and interface routine descriptions, as depicted and described herein). MS 110 may interface with MDs 130 for providing standard management functions, e.g., for accessing and controlling MDs 130, including monitoring and controlling operational characteristics of MDs 130. For example, MS 110 may support element management functions (e.g., monitoring and controlling hardware, services, and the like, of individual MDs 130 and/or across multiple MDs 130), network management functions (e.g., service provisioning functions, performance monitoring functions, and the like, of individual MDs 130 and/or across multiple MDs 130), and the like, as well as various combinations thereof.

MS 110 may be implemented in any manner for supporting the present invention. Since interfaces to MDs 130 are defined using one or more universally interpreted languages and one or more associated descriptive languages, MS 110 is implemented supporting one or more universally interpreted languages and one or more associated descriptive languages. For example, universally interpreted languages supported by MS 110 may include one or more of Java, Visual Basic, Microsoft .NET, Microsoft J++, and the like, as well as various combinations thereof. For example, descriptive languages supported by MS 110 may include one or more of Extensible Markup Language (XML), Extensible Hypertext Markup Language (XHTML), and the like, as well as various combinations thereof. MS 110 supports DHCP-based functions (e.g., MS 110 may include a DHCP server, MS 110 may be adapted for interfacing with DHCP servers, and the like).

CN 120 provides communication paths supporting communications between MDs 130 (e.g., user traffic, control traffic, and the like as well as various combinations thereof), including communication paths between network-based MDs 130, and between network-based MDs 130 and customer MDs 130. CN 120 provides communication paths supporting communications between MS 110 and MDs 130 (e.g., device interface discovery traffic, device management traffic, and the like, as well as various combinations thereof). In one embodiment, CN 120 is a packet-based network, such as an IP network. For example, CN 120 may be the Internet (and, optionally, one or more other public and/or private IP-based networks).

MDs 130 include any IP network devices. For example, MDs 130 may include network devices (e.g., routers, IP switches, border elements, call control elements, media servers, applications servers, and the like), customer devices (e.g., IP-Private Branch Exchanges (IP-PBXs), terminal adapters (TAs), routers, cable modems, DLS gateways, computers, VoIP phones, mobile phones, and the like), and the like, as well as various combinations thereof. MDs 130 may be accessed by MS 110 and, thus, may be monitored and controlled by MS 110. MDs 130 may receive and process commands (initiated from MS 110) adapted to perform various control functions on MDs 130, such as configuring MDs 130, requesting status information from MDs 130, provisioning services on MDs 130, and performing like control functions.

As described herein, MS 110 obtains managed device interface information for MDs 130, thereby enabling MS 110 to access and control MDs 130 (without requiring MS 110 to have any a priori knowledge regarding MDs 130). The managed device interface information for an MD 130 includes one or more interface routines 142 and one or more interface routine descriptions 143. (i.e., relationships between interface routines 142 and interface routine descriptions 143 may be 1:N, N:1, or N:N). In other words, one interface routine 142 may be described by one or more associated interface routine descriptions 143, one interface routine description 143 may describe one or more interface routines 142, or one or more interface routines 142 may be described by one or more interface routine descriptions 143.

An interface routine 142 for a MD 130 provides software by which a management system may interface with the MD 130. An interface routine 142 is specified using a universally interpreted language (e.g., Java, Visual Basic, Microsoft .NET, Microsoft J++, and the like, as well as various combinations thereof). An interface routine description 143 for an interface routine 142 provides a description of the interface routine 142, providing enough information to synthesize use of the interface routine 142. For example, an interface routine description 143 may define subroutines, parameters, and like information of the associated interface routine 142. An interface routine description 143 may be specified using any descriptive language adapted to define an interface (e.g., XML, XHTML, and the like, as well as various combinations thereof).

The interface routines 142 and interface routine descriptions 143 for a given MD 130 may be stored in any manner such that MS 110 may retrieve the interface routines 142 and interface routine descriptions 143 for the given MD 130. In one embodiment, for example, interface routines 142 and interface routine descriptions 143 for a given MD 130 may be stored on that MD 130 and/or on one or more network devices. For example, as depicted in FIG. 1, interface routines 142 and interface routine descriptions 143 for some of the MDs 130 are stored on those MDs 130, while interface routines 142 and interface routine descriptions 143 for others of the MDs 130 are stored on one or more network devices (illustratively, on network web server 150 which has a database 151).

In one embodiment, in which interface routine(s) 142 and associated interface routine description(s) 143 for a given MD 130 are stored on that MD 130, the MD 130 may include a small web server, or at least some web server functionality, adapted for providing interface routine(s) 142 and interface routine description(s) 143 to MS 110 in response to a web-based request from MS 110. In one embodiment, in which a given MD 130 does not include a web server or web server functionality, interface routine(s) 142 and associated interface routine description(s) 143 for that given MD 130 may be stored on one or more network devices (illustratively, network web server 150) adapted for providing interface routine (s) 142 and associated interface routine description(s) 143 to MS 110 in response to a web-based request from MS 110.

Although primarily depicted and described with respect to an embodiment in which interface routines 142 and interface routine descriptions 143 for some of the MDs 130 are stored on the respective MDs 130 while interface routines 142 and interface routine descriptions 143 for others of the MDs 130 are stored network web server 150, the present invention may be implemented using other implementations. In one embodiment, for example, interface routines 142 and interface routine descriptions 143 for each of the MDs 130 are stored on the respective MDs 130. In another embodiment, for example, interface routines 142 and interface routine descriptions 143 for each of the MDs 130 are stored on one or more network devices.

As described herein, the interface routines 142 and interface routine descriptions 143 for a given MD 130 are obtained by MS 110 and subsequently maintained by MS 110 for use in accessing and controlling that MD 130 (without requiring the management system to have any a priori knowledge regarding that MD 130). The retrieval of interface routines 142 and interface routine descriptions 143 for MDs 130 by MS 110, and subsequent use of interface routines 142 and interface routine descriptions 143 by MS 110 to access and control associated MDs 130, may be better understood with respect to FIG. 2.

Figure 2:
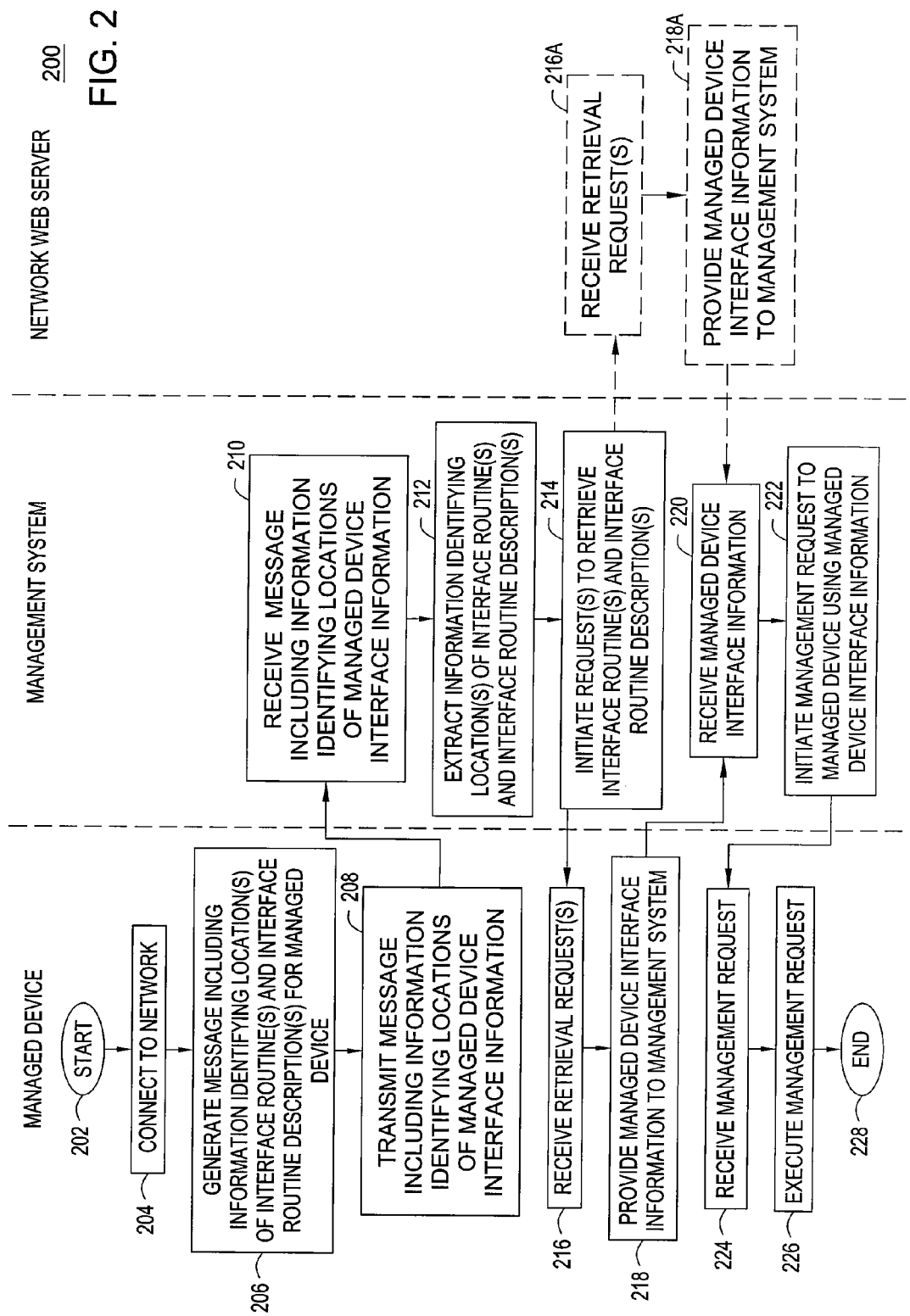
FIG. 2 depicts a method according to one embodiment of the present invention.

FIG. 2 depicts a method according to one embodiment of the present invention. Specifically, method 200 of FIG. 2 includes a method for providing interface routines and interface routine descriptions for a managed device to a management system (for use by the management system to interface with the managed device in order to access and control the managed device to perform management functions for the managed device). Although depicted and described as being performed serially, at least a portion of the steps of method 200 of FIG. 2 may be performed contemporaneously, or in a different order than depicted and described with respect to FIG. 2. The method 200 begins at step 202 and proceeds to step 204.

At step 204, a managed device connects to the network. For example, the managed device may be powered on while physically connected to the network via a network cable, physically connected to the network via a network cable while powered on, and the like, as well as various combinations thereof. In one embodiment, the connection of the managed device to the network may be any connection which triggers the managed device to request an address. For example, the connection of the managed device to the network may be a connection which triggers the managed device to request an IP address using a Dynamic Host Configuration Protocol (DHCP) message or another similar address request message.

At step 206, the managed device generates a DHCP message. The DHCP message is adapted for requesting an IP address for the managed device. The DHCP message includes information identifying a location (or locations) from which interface information (i.e., interface routine(s) and interface routine description(s)) may be retrieved for the managed device. In one embodiment, the information identifying one or more locations from which the managed device interface information may be retrieved may include one or more Uniform Resource Locators (URLs) indicative of the location(s) at which the interface routine(s) and the interface routine description(s) for that managed device are maintained (and, thus, from which this managed device interface information may be fetched by the management system). For example, the location of each interface routine and each interface routine description for the managed device may be specific using a separate URL.

At step 208, the managed device transmits the DHCP message toward management system. In one embodiment, in which the management system includes a DHCP server, the managed device forwards the DHCP message to the management system. In another embodiment, in which the management system does not include a DHCP server, the managed device transmits the DHCP message to a DHCP server which, upon receiving the DHCP message: (1) performs standard DHCP processing to assign an IP address to the managed device and notify the managed device of the assigned IP address; and (2) propagates the information indicative of the locations(s) of the managed device interface information to the management system (e.g., by forwarding the DHCP message, by generating a separate message including the location information, and the like).

At step 210, the management system receives a message including the information indicative of the location(s) of the managed device interface information (e.g., in a DHCP message received directly from the managed device, in a DHCP message received from a DHCP server that is serving the managed device, in a different message received from a DHCP server that is serving the managed device, and the like). Although primarily depicted and described with respect to using DHCP to communication the information indicative of the location(s) of the managed device interface information, the information indicative of the location(s) of the managed device interface information may be communicated using other protocols and associated messages.

At step 212, the management system extracts, from the received message, the information indicative of the location (s) of the managed device interface information. The management system may use any form of message processing by which such information may be extracted. The processing of the message may depend on the type of message received (e.g., the processing may be different for DHCP messages than for other types of address request messages, or other messages, which may be used to propagate the information indicative of the location(s) of the managed device interface information).

Although primarily depicted and described with respect to using a DHCP message to provide the information identifying one or more locations from which the managed device interface information may be retrieved, in one embodiment, a separate message may be initiated by the managed device to provide information identifying one or more locations from which the managed device interface information may be retrieved. The separate message including the information identifying one or more locations from which the managed device interface information may be retrieved may be initiated by the managed device contemporaneously with the generation and transmission of the address request message (e.g., initiated in response to connecting to the network), after the managed device has obtained an address, or at any other time.

At step 214, the management system initiates a request to retrieve the managed device interface information. The management system initiates a request to retrieve the managed device interface information using the extracted information indicative of the location(s) of the managed device interface information. In one embodiment, in which the identifier(s) indicative of the location(s) of the managed device interface information is a URL(s), the management system may initiate the request(s) to retrieve the managed device interface information using the Hypertext Transfer Protocol (HTTP) or any similar protocol.

Although primarily depicted and described with respect to initiating a single HTTP request to a single URL, multiple HTTP requests may be initiated to multiple URLs in order to retrieve the interface information for the managed device (e.g., where each interface routine and interface routine description is maintained at a separate storage location specified by a separate URL). For example, where the location of each interface routine and interface routine description for the managed device is specific using a different URL, the management system may initiate a separate HTTP request for each URL identifying a location of managed device interface information for that managed device.

In one embodiment, in which the managed device interface information is stored on that managed device (e.g., where the managed device includes a small web server or web server functionality), the management system initiates the request (s) to retrieve the managed device interface information to the managed device (illustratively, method 200 proceeds to step 216), and receives the managed device interface information from the managed device. In one embodiment, in which the managed device interface information is stored on a network web server (e.g., where the managed device does not include web server functionality), the management system initiates the request(s) to retrieve the managed device interface information to the network web server (illustratively, method 200 proceeds to optional step 216A), and receives the managed device interface information from the network web server.

At step 216, the managed device receives the retrieval request(s) from the management system. At step 218, the managed device responds to the retrieval requests(s) by providing the requested managed device interface information to the management system. For example, where the retrieval request(s) is received as an HTTP request message(s), the requested managed device interface information is provided to the management system using a corresponding HTTP response message(s). From step 218, method 200 proceeds to step 220, at which point the management system receives the managed device interface information from the managed device.

At step 216A, the network web server receives the retrieval request(s) from the management system. At step 218A, the network web server responds to the retrieval requests(s) by providing the requested managed device interface information to the management system. For example, where the retrieval request(s) is received as an HTTP request message (s), the requested managed device interface information is provided to the management system using a corresponding HTTP response message(s). From step 218A, method 200 proceeds to step 220, at which point the management system receives the managed device interface information from the network web server.

At step 220, the management system receives the managed device interface information (e.g., from the managed device and/or from the network web server or servers). At step 222, the management system initiates a management request to the managed device using the managed device interface information. The management system initiates the management request to the managed system using the managed device interface information. At step 224, the managed device receives the management request from the management system. At step 226, the managed device executes the management request to perform some management function(s) specified by the management system in the management request. At step 228, method 200 ends.

Thus, the managed device interface information retrieved by the management system using the present invention provides the management information with all of the information needed in order for the management system to access and control the managed device. The management system may then managed the managed device, performing various management functions depending on the type of managed device and the type of management system managing the managed device. For example, the management system may initiate management requests to configure the managed device, to retrieve status information from the managed device, to provision services on the managed device, and the like, as well as various combinations thereof.

Furthermore, in addition to providing low-level control of managed devices, managed device interface information retrieved by the management system using the present invention may be leveraged by the management system to perform higher level management functions. For example, where a user would like configure his home network to support a virtual LAN (VLAN), rather than requiring the user to configure his home computer to support the VLAN and configure his router to support the VLAN, the present invention could be used to synthesize a service which configures both the router and the home computer to support the VLAN (i.e., creates the VLAN and the associated VLAN membership) using one request by the user (e.g., the user selects an APPLY VLAN TO MY HOME NETWORK option). In other words, the present invention may be used to create higher-level abstracted services.

Figure 3:
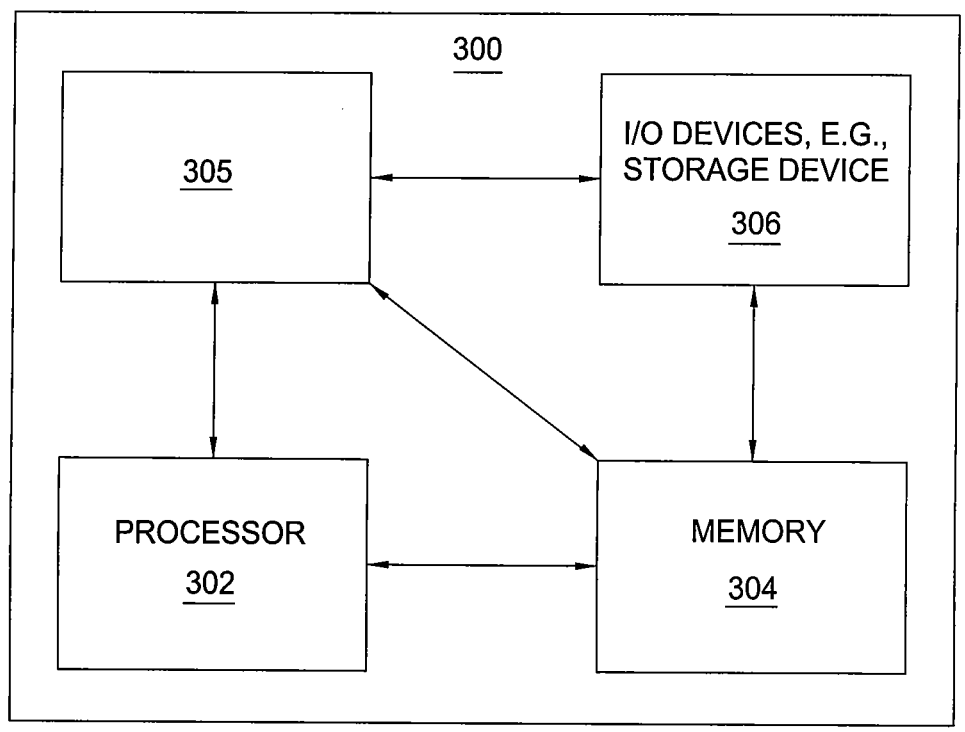
FIG. 3 depicts a high-level block diagram of a general-purpose computer suitable for use in performing the functions described herein.

FIG. 3 depicts a high-level block diagram of a general-purpose computer suitable for use in performing the functions described herein. As depicted in FIG. 3, system 300 comprises a processor element 302 (e.g., a CPU), a memory 304, e.g., random access memory (RAM) and/or read only memory (ROM), an interface control module 305, and various input/output devices 306 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present interface control process 305 can be loaded into memory 304 and executed by processor 302 to implement the functions as discussed above. As such, interface control process 305 (including associated data structures) of the present invention can be stored on a computer readable medium or carrier, e.g., RAM memory, magnetic or optical drive or diskette, and the like.

Although primarily depicted and described herein with respect to specific networks and associated protocols, the present invention may be implemented in other types of networks and/or using other types of protocols. For example, although depicted and described with respect to IP networks, the present invention may be used in other types of networks (e.g., ATM networks, FR networks, and the like). For example, although depicted and described with respect to using DHCP to request an address, the present invention may be used with other address request protocols. For example, although depicted and described with respect to using HTTP, the present invention may be used with other information request/response protocols. Thus, the present invention is not intended to be limited to use with specific networks and/or protocols.

Furthermore, although primarily depicted and described herein within the context of a telecommunication network, the present invention may be utilized in any application in which one or more devices are managed by a management device. For example, the present invention may be used in a premises control network in which a premises computer(s) controls one or more devices at the premises (e.g., a home control network, a business control network, and the like), a factory control network in which a management system controls one or more machines operating in the factory, and the like. Thus, the present invention may be utilized in any application in which one or more devices are managed by a management device, and is not intended to be limited to any particular application.

For example, in a home control network, a computer in the home may utilize the present invention to control one or more devices in the home (e.g., a service may be written or synthesized to control multiple devices). As described herein, such services may be written or synthesized by performing the present invention for each of the devices to be controlled by the home computer (i.e., by obtaining interface information for each of the devices to be controlled by the home computer).

In one example, a service for nighttime pool use may be written or synthesized to perform the following functions: turn on the outdoor lights, disable the home security system, turn on the pool heating system, and turn on a radio and switch to speakers in the outdoor pool area. In this example, the home computer may utilize the present invention to obtain interface information for each of the lighting control system, the home security system, the pool control system, and the home audio-visual (AV) system in order to be able to access and control the lighting control, home security, pool control, and home AV systems to provide the nighttime pool use service.

In another example, a service for watching a Blu-Ray movie on an AV system may be written or synthesized to perform the following functions: turn on the receiver, turn on the Blu-Ray player, switch the receiver to the Blu-Ray input, turn on the TV, tune to the "TV display" function, switch the TV display function to the Blu-Ray player, and select the START option on the Blu-Ray player to start the movie. In this example, the home computer may utilize the present invention to obtain interface information for each of the receiver, the Blu-Ray player, and the television in order to be able to access and control the receiver, Blu-Ray player, and television to provide the Blu-Ray movie service.

It is contemplated that some of the steps discussed herein as software methods may be implemented within hardware, for example, as circuitry that cooperates with the processor to perform various method steps. Portions of the present invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a broadcast or other signal bearing medium, and/or stored within a working memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. A method for interfacing with a managed device, comprising:
   receiving, at a management system, a message including an identifier indicative of a location at which interface information associated with the managed device is stored, wherein the interface information comprises information adapted for use by a management system to interface with the managed device;
   obtaining the interface information, wherein the interface information comprises an interface routine and a description of the interface routine, wherein the interface routine is specified using an interpreted language, wherein the interface routine description is specified using a descriptive language; and
   initiating a request to perform a function on the managed device using the interface routine and the interface routine description.

2. The method of claim 1, wherein the message is received from one of the managed device and a Dynamic Host Configuration Protocol (DHCP) server.

3. The method of claim 1, wherein the identifier comprises a Uniform Resource Locator (URL).

4. The method of claim 1, wherein obtaining the interface information comprises:
   retrieving the interface routine and the interface routine description from the managed device.

5. The method of claim 1, wherein obtaining the interface information comprises:
   retrieving the interface routine and the interface routine description from a network-hosted web server.

6. The method of claim 1, wherein the interface routine and the interface routine description for the managed device are obtained using Hypertext Transfer Protocol (HTTP).

7. The method of claim 1, wherein the interpreted language comprises one of Java, Visual Basic, Microsoft.NET, and Microsoft J++.

8. The method of claim 1, wherein the descriptive language comprises one of Extensible Markup Language (XML) and Extensible Hypertext Markup Language (XHTML).

9. The method of claim 1, wherein the request comprises at least one of:
   a request to configure the managed device, a request for status from the managed device, and a request to provision a service on the managed device.

10. An apparatus for interfacing with a managed device, comprising:
    a processor configured for:
    receiving a message including an identifier indicative of a location at which interface information associated with the managed device is stored, wherein the interface information comprises information adapted for use by a management system to interface with the managed device;
    obtaining the interface information, wherein the interface information comprises an interface routine and a description of the interface routine, wherein the interface routine is specified using an interpreted language, wherein the interface routine description is specified using a descriptive language; and
    initiating a request to perform a function on the managed device using the interface routine and the interface routine description.

11. The apparatus of claim 10, wherein the message is received from one of the managed device and a Dynamic Host Configuration Protocol (DHCP) server.

12. The apparatus of claim 10, wherein the identifier comprises a Uniform Resource Locator (URL).

13. The apparatus of claim 10, wherein obtaining the interface information comprises:
    retrieving the interface routine and the interface routine description from the managed device.

14. The apparatus of claim 10, wherein obtaining the interface information comprises:
    retrieving the interface routine and the interface routine description from a network-hosted web server.

15. The apparatus of claim 10, wherein the interface routine and the interface routine description for the managed device are obtained using Hypertext Transfer Protocol (HTTP).

16. The apparatus of claim 10, wherein the interpreted language comprises one of Java, Visual Basic, and Microsoft J++.

17. The apparatus of claim 10, wherein the descriptive language comprises one of Extensible Markup Language (XML) and Extensible Hypertext Markup Language (XHTML).

18. The apparatus of claim 10, wherein the request comprises at least one of a request to configure the managed device, a request for status from the managed device, and a request to provision a service on the managed device.

19. A non-transitory computer readable storage medium storing a software program that, when executed by a computer, causes the computer to perform a method for interfacing with a managed device, the method comprising:
    receiving a message including an identifier indicative of a location at which interface information associated with the managed device is stored, wherein the interface information comprises information adapted for use by a management system to interface with the managed device;
    obtaining the interface information, wherein the interface information comprises an interface routine and a description of the interface routine, wherein the interface routine is specified using an interpreted language, wherein the interface routine description is specified using a descriptive language; and
    initiating a request to perform a function on the managed device using the interface routine and the interface routine description.

20. A method, comprising:
    receiving, at a managed device, a request from a management system to retrieve interface information adapted for use by the management system to interface with the managed device; and
    propagating the requested interface information toward the management system;
    wherein the interface information comprises an interface routine and a description of the interface routine, wherein the interface routine is specified using an interpreted language, wherein the interface routine description is specified using a descriptive language.

* * * * *